United States Patent Office 2,813,878
Patented Nov. 19, 1957

2,813,878

METHOD OF PREPARING EPOXIDIZED OILS AND THE LIKE

Arvi W. Wahlroos, Minneapolis, Minn., assignor to Archer-Daniels-Midland Company, a corporation of Delaware No Drawing. Original application January 26, 1953, Serial No. 333,372. Divided and this application November 4, 1955, Serial No. 545,131

2 Claims. (Cl. 260—348.5)

In the copending application, Serial No. 333,372, filed January 26, 1953, to which I was originally a party and of which the present application is a division, there is disclosed a process for the epoxidation of unsaturated higher fatty acid esters and other aliphatic compounds such as acids and amines, by heating such aliphatic compounds with a catalytic amount of sulfuric acid and with about ½ mole of acetic acid (e. g. from 0.4 mole to 0.6 mole) for each mole of unsaturation of the aliphatic compound and about one mole of hydrogen peroxide (e. g. from about 0.7 mole to 1.1 moles) for each mole of unsaturation of the aliphatic compound.

Preferably the hydrogen peroxide is added directly to the aliphatic compound and then the acetic and sulfuric acid are added to the reaction mass gradually over an extended period of time. With the concentrations employed, this reaction is markedly exothermic and substantial cooling must take place. However, it has been found that during the addition of the acids and the subsequent reaction period the temperature may be allowed to rise up to between 90° F. and 150° F. At the higher temperatures the reaction proceeds more rapidly but again there is danger of splitting the oxirane ring and decomposing $H_2O_2$ and it is preferable to use temperatures of between 120° F. and 135° F. Within this range the reaction is substantially complete in from 10 to 12 hours.

I have discovered that after the reaction has been completed it is not necessary to wash the reacted compound. By letting it stand for an hour or two (or by centrifuging a gravity separation takes place and the aqueous layer will be found to contain the major proportion of the acetic acid, with substantial percentages of hydrogen peroxide. This latter layer can be used further. For example, if the aqueous layer contains approximately 10% of hydrogen peroxide, it may be reacted with fresh oil at the temperature stated until the quantity of hydrogen peroxide is reduced, say, to about 1%. This aqueous layer may then be removed for recovery of the acetic acid content by rectification. The oil treated in this way will be only partially epoxidized but may then be treated with a fresh charge of hydrogen peroxide and acetic acid (containing sulfuric acid) in an amount sufficient to raise the oxirane level to the desired point, say approximately 6%. After the conclusion of this second reaction, the spent aqueous layer from it is again available for reaction with fresh oil. By employing this cyclic process virtually all of the hydrogen peroxide charged into the reaction mixture is utilized.

After the aqueous layer is separated from the oily layer the $H_2SO_4$ in the product is neutralized preferably with an excess of alkali (e. g. a dilute solution of NaOH) and the mixture is steam-distilled at a reduced pressure at a temperature which may range up to 250° F. to remove acetic acid dissolved in the reaction product. This acetic acid condensate may also be rectified and reused so that very little acetic acid is wasted.

My invention may readily be understood from the following illustrative example:

650 pounds of soybean oil was used having 1.06 moles of unsaturation per 200 grams. There was used 78 pounds of acetic acid again equivalent to 0.4 mole of acetic per 1.06 moles of unsaturation. In this run there was employed 240 pounds of 46.3% $H_2O_2$ equivalent to one mole of $H_2O_2$ for each 1.06 moles of unsaturation. 3.9 pounds of sulfuric acid was mixed with the acetic acid.

This run was made in a four-barrel stainless steel tank equipped with heating or cooling coils and stirrer. The oil was put in this tank and 48 pounds of the 46.3% peroxide was added. When a temperature of 125° F. was reached, the remaining 80% of peroxide and the solution of sulfuric acid and glacial acetic acid were added separately and proportionally as follows: 30% of each during the first hour, 20% of each during the second hour, 20% of each during the third hour and the remaining 30% of each during the fourth hour.

The batch was held at a temperature between 125° F. and 135° F. for 13 hours at which time the stirrer was stopped and after 2½ hours settling the aqueous layer was drawn off. The oily layer was treated with dilute sodium hydroxide solution containing 1½ equivalents for each equivalent of sulfuric acid present. The reaction product was then transferred to a stainless steel autoclave and steam-distilled at reduced pressure up to 250° F. The acetic acid can be recovered and rectified for re-use.

The aqueous layer amounting to 217 pounds contained 28% of acetic acid, 1.2% of sulfuric acid and 4.8% of active oxygen as peracetic acid and peroxide. This material was reacted for 12 hours at 130° F. with 642 pounds of fresh soybean oil. The percent of active oxygen in the aqueous layer then obtained by centrifuging a small sample of the reaction mixture was reduced to less than 1. At this point agitation was stopped and the reaction mixture was permitted to settle. The aqueous layer can be drawn off and after decomposing the remaining active oxygen, the acetic acid can be recovered.

The oily reaction product with an oxirane value of 1.2 was further reacted at 130° F. with 225 pounds of 50% $H_2O_2$, 87.8 pounds of acetic acid (80%) and 4 pounds of sulfuric acid. These reactants were added proportionally in the manner already described. After a total of 10 hours the oxirane content had reached 6%. The stirrer was then stopped and the batch was allowed to settle. The aqueous layer was withdrawn for re-use as described and the oily layer after neutralization was given the same type of steam distillation as was used in the other batches.

It will be seen from the foregoing that it is possible to obtain a high percentage of oxidized oil which may run up close to 80% and at the same time to operate the process extremely efficiently, as there is very little loss of reagents.

It is understood that the example given is only by way of illustration and is not intended to constitute a limitation upon the scope of my invention.

What I claim is:

1. In the process for the epoxidation of organic compounds containing a long-chain unsaturated aliphatic group selected from the group consisting of acids, esters and amides by heating such compound in the presence of a catalytic amount of sulfuric acid together with about one-half a mole of acetic acid for each mole of unsaturation of said compound and about one mole of hydrogen peroxide for each mole of unsaturation of such compound, the steps of removing water and water soluble bodies from the reacted product by gravity separation and using such aqueous layer for treating additional quantities of the unsaturated organic compound without restoring the peroxide content to its original proportion relative to the acetic acid.

2. A process as specified in claim 1 which comprises the additional steps of separating the water and water soluble bodies from the reacted product by gravity separation and further reacting the oily material with additional quantities of acetic acid containing catalytic amounts of sulfuric acid and hydrogen peroxide to bring the reaction product up to the desired oxirane value.

References Cited in the file of this patent

UNITED STATES PATENTS

| | | |
|---|---|---|
| 2,485,160 | Niederhauser | Oct. 18, 1949 |
| 2,567,930 | Findley | Sept. 18, 1951 |

OTHER REFERENCES

Findley, J. A. C. S. 67: 412–414 (1945).

UNITED STATES PATENT OFFICE
CERTIFICATE OF CORRECTION

Patent No. 2,813,878

November 19, 1957

Arvi W. Wahlroos

It is hereby certified that error appears in the above numbered patent requiring correction and that the said Letters Patent should read as corrected below.

Column 1, line 20, for "amines" read -- amides --.

Signed and sealed this 31st day of December 1963.

(SEAL)
Attest:

ERNEST W. SWIDER
Attesting Officer

EDWIN L. REYNOLDS
Acting Commissioner of Patents